United States Patent [19]

Cerny et al.

[11] 4,247,450

[45] Jan. 27, 1981

[54] COMPOSITIONS BASED ON FLAMEPROOFED POLYAMIDE

[75] Inventors: Jacqueline Cerny, Lyons; Robert Troncy, Oullins, both of France

[73] Assignee: Rhone-Poulenc Industries, Paris, France

[21] Appl. No.: 36,697

[22] Filed: May 7, 1979

Related U.S. Application Data

[63] Continuation of Ser. No. 840,633, Oct. 11, 1977, abandoned.

[51] Int. Cl.³ .................. C08K 5/13; C08K 5/06; C08K 5/03
[52] U.S. Cl. .................. 260/45.75 W; 260/37 N; 260/45.95 G; 260/45.95 R; 260/45.7 R
[58] Field of Search ..... 260/37 N, 45.75 W, 45.7 RL, 260/45.95 G, 45.95 R

[56] References Cited

U.S. PATENT DOCUMENTS

| | | | |
|---|---|---|---|
| 3,344,107 | 9/1967 | Miller | 260/37 N |
| 3,468,843 | 9/1969 | Busse | 260/45.75 W |
| 3,524,761 | 8/1970 | Humphrey | 260/45.75 W |

*Primary Examiner*—V. P. Hoke
*Attorney, Agent, or Firm*—Burns, Doane, Swecker & Mathis

[57] ABSTRACT

Polyamides flameproofed with a halogenated derivative and including cadmium oxide as an additive to improve the arcing resistance of the polyamide are disclosed. The polyamides are particularly useful in the manufacture of electrical components.

5 Claims, No Drawings

COMPOSITIONS BASED ON FLAMEPROOFED POLYAMIDE

This is a continuation, of Application Ser. No. 840,633, filed Oct. 11, 1977 now abandoned.

BACKGROUND OF THE INVENTION

1. Field of the Invention

The present invention relates to compositions based on flameproofed polyamide.

2. Description of the Prior Art

Various means have been proposed for imparting a flame-resistant character to polyamides. These means, especially include the incorporation into the polyamide composition of halogenated products to which certain inorganic oxides, such as those derived from arsenic, bismuth and antimony, are frequently added (French Patent 1,568,952). In fact, the use of halogenated derivatives makes it possible to impart effective fire-resistance to the polyamides. However, it has been found that the articles manufactured from these compositions exhibit, on the other hand, a fairly low arcing resistance (in terms of Standard Specification NF C 26,220). Now, a high arcing resistance is a necessity in numerous applications, in particular in the electrical or electronics industries.

SUMMARY OF THE INVENTION

The present invention therefore proposes to provide polyamide-based compositions which lead to articles exhibiting both good fire-resistance and good arcing resistance. These compositions, which comprise a polyamide and a halogenated derivative, are characterised in that they contain cadmium oxide.

DETAILED DESCRIPTION OF THE INVENTION

More precisely, these compositions contain, in addition to the polyamide [in percentage of the total weight of the composition], from 5 to 25% of a flameproofing agent, chosen from amongst the halogenated derivatives, and from 0.2 to 20% of cadmium oxide.

The polyamide can be chosen from amongst the different polymers of this type which are available. They can be products obtained by polycondensation of diacids and of diamines, or by homopolycondensation of amino-acids or also by polymerisation of lactams. By way of illustration, there may be mentioned especially the polyhexamethylene adipamides and the polycaprolactams.

In the invention, halogenated derivative denotes essentially the chlorinated and brominated derivatives of monocyclic or polycyclic hydrocarbons of aliphatic or aromatic character. Amongst these products, there may be mentioned especially decabromodiphenyl, tetrabrominated bisphenol, decabromodiphenyl oxide, hexabromobenzene, pentabromotoluene, the chlorinated derivatives of diphenyl or also the product of the dienic synthesis between 2 mols of hexachlorocyclopentadiene and one mol of cyclooctadiene. This product corresponds to the empirical formula $C_{18}H_{12}Cl_{12}$—which will be used to denote the formula hereafter—and the following formula is generally assigned to the product:

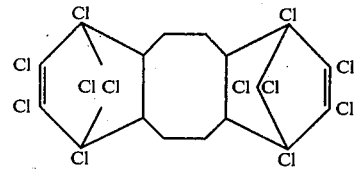

The amount of flameproofing agent (halogenated derivative) represents preferably 10 to 20% of the total weight of the composition.

The flame-resistant effect of the halogenated derivatives can be advantageously reinforced by the use of certain inorganic compounds, such as the abovementioned oxides (derivatives of arsenic, bismuth and antimony) or also zinc borate. In general, the proportion of inorganic additive does not exceed 40% of the weight of the halogenated derivative.

With regard to the cadmium oxide, both the amorphous variety and the crystalline variety can be used. In general, it is desirable to use an anhydrous product in order to prevent any liberation of water during the moulding of the composition. The oxide is preferably used in the form of a powder of a particle size which does not exceed 100$\mu$, for example of between 5 and 100 $\mu$.

The compositions according to the invention have been previously defined by their essential constituents. These compositions can of course contain those adjuvants, the usage of which is generally recognised. It is thus possible to incorporate into these compositions reinforcing or gelling fillers, such as glass fibres or asbestos fibres, glass microspheres, kaolin, talc, silica, micas, bentonites or bentones. Glass fibres are the most commonly employed fillers; the diameter of the fibres is generally between 1 and 10 $\mu$ and their length can vary between 2 and 6 mm. Articles possessing improved mechanical properties are obtained by using fibres which are sized, for example with epoxy resins, polyester, polyurethanes or vinyl polymers.

When fillers such as those mentioned above are used, their amount can represent from 20 to 50% of the total weight of the composition.

Other additives can also be used, such as lubricants, agents for increasing the impact strength, antistatic agents and crystallising agents. These various additives, as well as their use, are widely described in the literature.

The new compositions can be converted into finished or semi-finished articles by application of the usual injection or extrusion techniques. In general, the conversion is carried out within a temperature range which can vary from 200° to 320° C. The articles obtained are fire-resistant, on exposure to a flame do not lead to the formation of droplets of molten material, which may be burning, and exhibit an excellent arcing resistance (according to Standard NF/C 26,220). Although the fields of use of articles of this kind are very varied, these articles are thus particularly suitable for uses in the industries concerned with electricity (namely the electrical, electronics, household electrical appliances, radio and automobile industries).

The following example illustrates the invention.

EXAMPLE 3,650 g of a polyhexamethylene adipamide having an average molecular weight of 20,000 and a viscosity index of 145 (determined by application of Standard Specification ISO R 307), 950 g of the halogenated compound of the empirical formula $C_{18}H_{12}Cl_{12}$ as described previously, 100 g of zinc borate of the formula: 2 ZnO. 3 $B_2O_3$. 3.5 $H_2O$, 100 g of antimony trioxide and 200 g of cadmium oxide are introduced into a mechanical mixer.

After homogenisation at ambient temperature (25° C.), the composition is introduced into a single-screw laboratory extruder, the screw of which has a diameter of 45 mm and a length of 900 mm. This extruder is equipped with a cylindrical die having a diameter of 3 mm.

The temperatures are as follows: 250°–260° C. in the feed zone, 270°–275° C. in the melting and compression zones and 260° C. at the die.

The throughput of the machine is 15 kg/hour.

The strand obtained is cut into granules and stored so as to be protected from moisture.

Test pieces of 127×12.7×1.6 mm are injection-moulded between 270° and 290° C. and are subjected to the Underwriters Laboratories UL 94 (vertical) test [as described in document 9750-1 of the Bureau de Normalisation des Matieres Plastiques] in order to measure the degree of flameproofing; the classification 94 VO is obtained.

The test for measuring the arcing resistance, as defined in the Standard NF 6,220, is also carried out; an index of more than 425 Volts is obtained.

By way of comparison, if cadmium oxide is not used, the value obtained is 350 Volts, the classification also being 94 VO in the flameproofing test.

We claim:

1. A composition of matter comprising a polyamide, an amount of a halogenated derivative compound selected from the group consisting of brominated and chlorinated derivatives of aliphatic and aromatic mono- and polycyclic organic compounds which is sufficient to flameproof said polyamide, and an amount of cadmium oxide sufficient to improve the arcing resistance of said polyamide.

2. The composition as defined by claim 1, containing from about 5 to about 25% of said halogenated derivative compound and from about 0.2 to about 20% cadmium oxide by weight based upon the total weight of the composition.

3. The composition as defined by claim 1, wherein said halogenated derivative compound is a product having the empirical formula $C_{18}H_{12}Cl_{12}$, obtained by a diene synthesis between 2 moles of hexachlorocyclopentadiene and 1 mole of cyclooctadiene.

4. The composition as defined by claim 1, wherein said halogenated derivative compound is selected from the group consisting of decabromodiphenyl, tetrabrominated bisphenol, decabromodiphenyl oxide, hexabromobenzene, pentabromotoluene and the chlorinated derivatives of diphenyl.

5. A shaped article comprising the composition of claim 1.

* * * * *